United States Patent
Skaistis et al.

(10) Patent No.: US 8,042,731 B2
(45) Date of Patent: *Oct. 25, 2011

(54) SYSTEMS AND METHODS FOR VALIDATING RFID TAG DATA PRIOR TO WRITING INTO RFID TAG

(75) Inventors: Jeffrey B. Skaistis, Tulsa, OK (US); Christopher A. Guzik, Owasso, OK (US); Michael S. Doyle, Claremore, OK (US)

(73) Assignee: United Parcel Service of America, Inc.

( * ) Notice: Subject to any disclaimer, the term of this patent is extended or adjusted under 35 U.S.C. 154(b) by 351 days.

This patent is subject to a terminal disclaimer.

(21) Appl. No.: 12/371,072

(22) Filed: Feb. 13, 2009

(65) Prior Publication Data

US 2009/0166405 A1   Jul. 2, 2009

Related U.S. Application Data

(63) Continuation of application No. 11/303,486, filed on Dec. 15, 2005, now Pat. No. 7,506,803.

(51) Int. Cl.
*G06F 17/00* (2006.01)
(52) U.S. Cl. .................... 235/375; 235/451; 235/492
(58) Field of Classification Search .................. 235/375, 235/492, 451; 340/10.1, 10.4, 10.51
See application file for complete search history.

(56) References Cited

U.S. PATENT DOCUMENTS

| 6,763,996 B2 | 7/2004 | Rakers et al. |
|---|---|---|
| 7,114,654 B2 | 10/2006 | Chapman et al. |
| 7,190,257 B2 | 3/2007 | Maltseff et al. |
| 7,278,571 B2 | 10/2007 | Schmidtberg et al. |
| 7,506,803 B2 * | 3/2009 | Skaistis et al. ............... 235/375 |
| 2004/0149826 A1 | 8/2004 | Alleshouse |
| 2004/0179547 A1 | 9/2004 | Kuffner et al. |
| 2005/0092825 A1 | 5/2005 | Cox et al. |
| 2005/0269407 A1 | 12/2005 | Harmon |

(Continued)

FOREIGN PATENT DOCUMENTS

EP   1587019   10/2005

OTHER PUBLICATIONS

EPCglobal Tag Data Translation (TDT) 1.0; Ratified Specification; Jan. 21, 2006, pp. 1-107.

(Continued)

*Primary Examiner* — Ahshik Kim
(74) *Attorney, Agent, or Firm* — Alston & Bird LLP

(57) ABSTRACT

The present invention is generally directed to systems and methods for validating RFID tag data prior to encoding the data onto an RFID tag, utilizing at least one computing device separate from an RFID encoder. An embodiment of the present invention describes a method of receiving RFID tag data at a computing device, validating that data in compliance with an RFID format, such as the EPC Global standard, and sending the validated data to an RFID encoder. An alternative embodiment provides a method for receiving RFID tag data at a computing device configured for verifying the data, and if the data is not valid, returning an informative error message to a user indicating the component of the data that was invalid and how the error can be corrected. A further embodiment provides a method for allowing a user to correct the RFID tag data and re-validate the data.

37 Claims, 3 Drawing Sheets

U.S. PATENT DOCUMENTS

2007/0131769 A1    6/2007  Tanaka

OTHER PUBLICATIONS

EPCglobal Tag Data Standards Version 1.3.1; Specification was ratified on Mar. 8, 2006; pp. 1-99.

EPCglobal Tag Data Standards Version 1.3; Ratified Specification; Mar. 8, 2006, pp. 1-97.

EPC™ Generation 1 Tag Data Standards Version; 1.1 Rev. 1.27; Standard Specification; May 10, 2005, pp. 1-87.

Monarch Products & Services, "The Monarch® 9855™ RFID Printer/Encoder," http://www.paxar.com/products/barcodeRFID/documents/Monarch_9855_RFMP_Printer.pdf, 2005.

Paxar Monarch, "RFID Printers," http://www.paxar.com/products/barcodeRFID/RFID.html.

Ed Hess, "RFID Printers Ready to Support Gen 2," Integrated Solutions, Jun. 2005, pp. 1-2, http://www.integratedsolutionsmag.com/Articles/2005_06/050610.htm.

RACO Industries, "Printronix SmartLine SL5000r RFID Smart Label Printers," pp. 1-5, http://www.racoindustries.com/printrsl5000r.htm.

International Search Report for PCT/US2006/030170 dated Mar. 16, 2007.

* cited by examiner

SYSTEMS AND METHODS FOR VALIDATING RFID TAG DATA PRIOR TO WRITING INTO RFID TAG

CROSS-REFERENCE TO RELATED APPLICATIONS

This application is a continuation of U.S. patent application Ser. No. 11/303,486, filed on Dec. 15, 2005 now U.S. Pat. No. 7,506,803, which is hereby incorporated herein in its entirety by reference.

BACKGROUND OF THE INVENTION

In the inventory management, shipping and logistics fields, barcodes are generally still the most prevalent way in which items are tagged for identification and tracking. Among the problems associated with them, barcode labels require that the optical scanner reading them have a clear "line-of-sight" view of the tag being read. This may require the scanner operator to position the scanner with respect to the barcode label in a manner that is awkward or may even be impossible depending upon the location of the tag. For example, if the barcode label to be read is on a box inside of a pallet of boxes, it may not be possible to read the label without disassembling the pallet. Furthermore, barcode labels can be scraped, marked, or otherwise obscured, rendering them difficult to read.

Radio-frequency identification (RFID) technology is one approach that can be used to solve the deficiencies of barcode labels as described herein. RFID tags do not require "line-of-sight" to read the tag, and thus RFID tags are expected to lead to major efficiencies and reduced costs for inventory management, shipping and logistics. In addition, in 2004, the Department of Defense and major US retailers began to require their vendors to tag items with RFID tags, making it a necessity for many companies to adopt RFID technology in their product and service offerings.

The relevant industries generally recognize a distinction between read-only RFID tags and writable RFID tags. In the former case, the RFID tag is manufactured with prestored data, and it cannot be subsequently modified. To the contrary, writable RFID tags permit data to be written into the RFID tag. The present invention is related to the latter variety of RFID tag.

At present, it is known that there are RFID printers that have the ability to write data into a tag, subsequently read that data, and verify that the RFID tag data was correctly written to the tag by the RFID printer. This form of RFID tag validation ensures that the printer wrote the RFID tag data correctly to the tag. However, it is not generally known in these circumstances whether the RFID tag data received by the printer was correct in terms of its format and content. Further, RFID printers are not effective devices for interactively informing users of such formatting and content errors, and enabling users to correct such data errors. An unsatisfied need thus exists for systems and methods for validating RFID tag data prior to sending the data to a printer for writing the data into an RFID tag.

BRIEF SUMMARY OF THE INVENTION

It is an object of the present invention to provide systems and methods for validating RFID tag data prior to writing the data into an RFID tag.

In accordance with one embodiment of the invention, a method of validating data to be written into an RFID tag may comprise the steps of: receiving RFID tag data, determining if the RFID tag data is valid by compliance with an RFID format, and if so, transmitting the RFID tag data to an RFID encoder to encode an RFID tag.

In accordance with another embodiment of the invention, a method of validating data to be written into an RFID tag using at least one computing device separate from an RFID encoder may comprise the steps of: receiving RFID tag data; executing an RFID validator object to determine if the RFID tag data is valid; and if the RFID tag data is determined to be valid by the RFID validator object, transmitting the RFID tag data to an RFID encoder for writing the RFID tag data into an RFID tag.

In accordance with another embodiment of the invention, a system for validating RFID tag data may comprise: at least one computing device comprising a processor and at least one memory connected to the processor and configured to store a computer program and an RFID validator object, wherein the computer program is executable by the processor to retrieve and assemble a segmented string of RFID tag data and to pass the segmented string of RFID tag data to the RFID validator object, the processor further executing the RFID validator object to determine whether the segmented string of RFID tag data is valid by compliance with an RFID format, and if so, to cause the RFID tag data determined to be valid to be transmitted from the computing device; and an RFID encoder connected to the computing device to receive the RFID tag data for encoding an RFID tag with the RFID tag data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
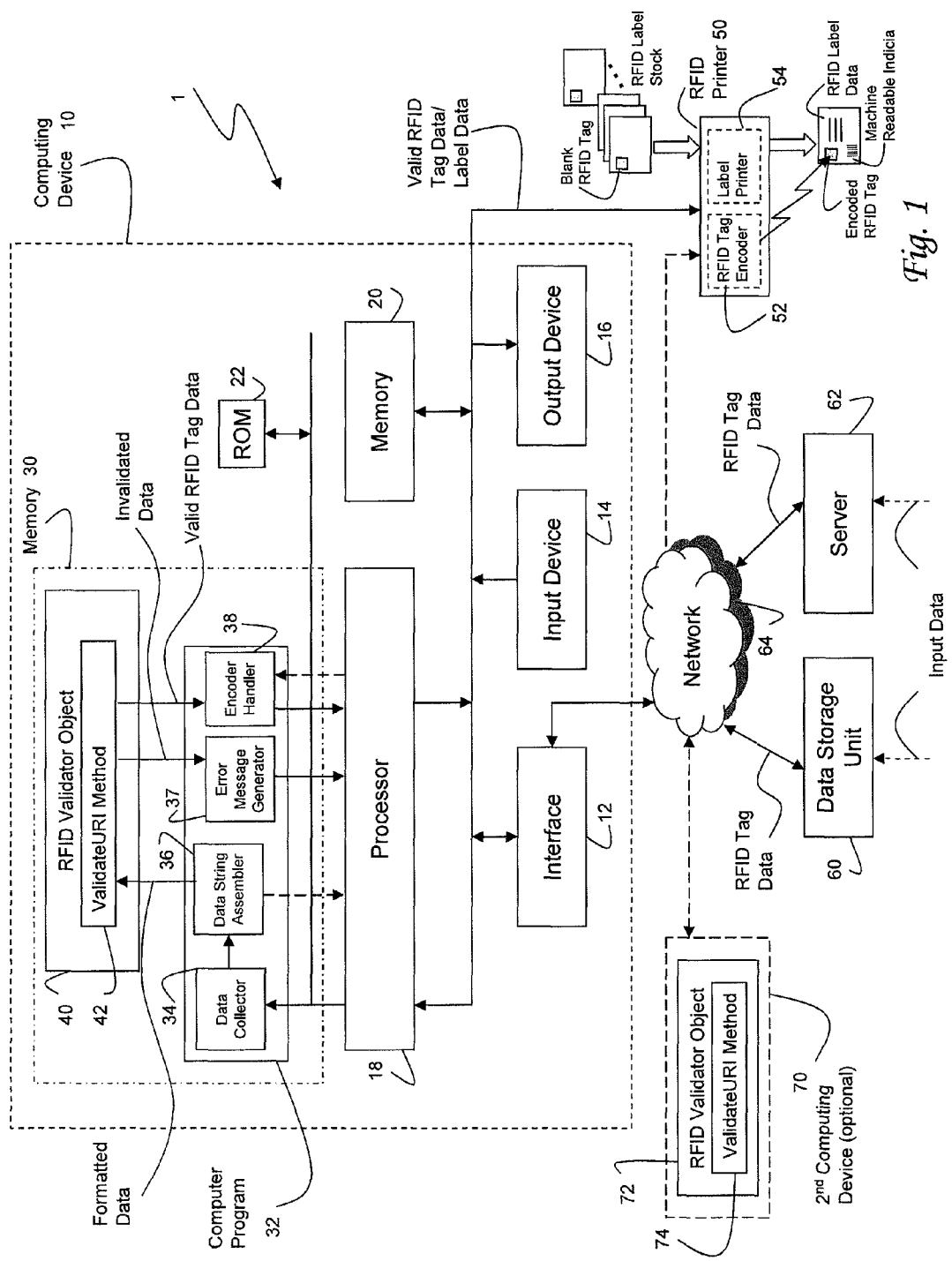
FIG. 1 is a block diagram of an RFID validating system in accordance with an embodiment of the present invention.

Embodiments of the present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Glossary of Terms

'Computing device' broadly refers to any kind of device which receives input data, processes that data under a computer instructions in a program or object, and generates output data such as a RFID tag data. Such computer can be a handheld device, laptop computer, desktop computer, miniframe, mainframe, server, cell phone, personal digital assistant, or other device. A 'computer' generally includes a processor and a memory, and input and output units with an interface unit enabling connection to other computers or devices.

'Connected' or 'coupled' refer to a physical connection between two computers permitting communication of data. Two devices can be connected directly together or indirectly through one or more intermediate elements, to permit communication of data/signal from one device to the other. Connection media include wire, optical fiber, or wireless transmission media such as air or space, permitting communication of data or a signal.

'Data storage unit' is any device capable of storing data, including random-access memory (RAM), read-only memory (ROM), electrically-erasable read-only memory (EEPROM), hard disk and disk drives, compact disc (CD), digital versatile disc (DVD), magnetic tapes and tape drives, optical storage media, quantum memory devices, and any other device that can be used to store data in readable form.

'Input device' can be a keyboard, keypad, mouse, wand, stylus, voice receiver, or any other device capable of receiving input data from a human user.

'Interface' can be a network interface card (NIC), a modem, or other interface device.

'Memory' can be any device capable of storing data, including random-access memory (RAM), read-only memory (ROM), electrically-erasable read-only memory (EEPROM), hard disk and disk drives, compact disc (CD), digital versatile disc (DVD), magnetic tapes and tape drives, optical storage media, quantum memory devices, holographic memory, and any other device that can be used to store data in readable form.

'Object' can be any item capable of being individually selected and manipulated by a computing device and may consist of both data and procedures to manipulate the data, and may be part of or independent of the computing device.

'Output device' can be a display monitor (e.g., CRT or flat panel display), speaker, vibration unit, or any other device that can be used in a computer to generate a humanly perceptible presentation.

'Processor' can be any device capable of receiving, processing, and outputting data under execution of a computer program or object, including a microprocessor, microcontroller, programmable gate array (PGA), field programmable gate array (FPGA), programmed array logic (PAL), programmable logic array (PLA), or other such device.

'Server' is a computer. The term can have a more refined meaning as a computer that executes a server application responsive to computers executing client applications or the like, i.e., client-server architectures.

Overview

The present invention is directed to systems and methods for validating RFID tag data prior to writing the data into an RFID tag. In one aspect, a system is provided comprising at least one computing device separate from an RFID encoder or RFID printer for validating RFID tag data prior to transmitting the data to the RFID encoder or printer for writing the data into an RFID tag. In another aspect, a method is provided for using the system to validate the RFID tag data to be written into an RFID tag. In one embodiment, if the computing device determines the data is valid, the computing device generates a message to a user indicating that the data is valid. Alternatively, if the computing device determines the data is not valid, the computing device generates a message indicating an error in the data. In some embodiments, the generated message further indicates to a user how the user can correct the data to produce valid RFID tag data.

As will be understood by one skilled in the art, the term "RFID tag data" can be used to describe both the individual data components that make up the segmented string (or URI) which is encoded into an RFID tag, as well as the segmented string itself, which is a concatenation of the individual data components.

RFID Validation System

In one aspect, a system is provided for validating the RFID tag data in compliance with an RFID format, prior to transmitting the data to an RFID encoder 52. In one embodiment of the present invention, the RFID format is the Electronic Product Code (EPC) Global format. Other RFID formats are discussed below.

An exemplary RFID validating system 1 is shown in FIG. 1. The system 1 comprises at least one computing device 10. In the embodiment of FIG. 1, the computing device 10 comprises a processor 18 and a memory 30 which is configured to store an RFID validator object 40 which is executable by the processor to validate RFID tag data in compliance with an RFID format, and a computer program 32. In some embodiments, the computing device 10 can also include an interface 12, an input device 14, an output device 16, and one or more additional memories 20.

The computer program 32 is configured to receive RFID tag data and format the data into a segmented string in compliance with an RFID format. In order to carry out this function, in the embodiment of FIG. 1, the computer program 32 comprises a data collector 34, a data string assembler 36, an error message generator 37, and an encoder handler 38. The RFID validator object 40 includes a method for validating RFID tag data, herein referred to as the ValidateURI Method 42.

In one embodiment, the RFID validating system 1 includes a data storage unit 60 separate from the computing device for the purpose of receiving and storing RFID tag data. In another embodiment, the system additionally includes a server 62 which is configured to receive RFID tag data. In the embodiment of FIG. 1, the data storage unit 60 and the server 62 are connected to communicate with the computing device 10 via a network 64.

The RFID validating system 1 also includes an RFID printer 50, which in one embodiment further includes an RFID encoder 52 for writing RFID tag data into an RFID tag, and a label printer 54 for printing the tag or label. Generally, an RFID printer 50 is a printer that is capable of encoding RFID tag data into an RFID tag and printing a label which includes or embeds the tag. Several companies offer RFID encoders, such as Printronix®, Inc., Datamax® Corporation, Zebra® Technologies Corporation, IBM® Corporation, Paxar® Corporation, Intermec® Technologies Corp., among others. The RFID printer 50 is configured both to print optically indicia on the label stock as well as to encode the tag in the RFID label stock. The printed and encoded label can be attached to an item for shipment, storage, or tracking, using RFID or optical readers, for example.

As will be described more fully hereinafter in reference to FIGS. 2 and 3, the processor 18 is configured to execute the computer program 32. The data collector 34 retrieves necessary RFID tag data, such as by retrieving information from one or more data storage units 60, or by accessing one or more other sources via server 62, or both. Upon receiving the RFID tag data, the data collector 34 passes the RFID tag data to the data string assembler 36, which concatenates the RFID tag data into a segmented string that is arranged in compliance with an RFID format in terms of the position of the data in the segmented string. The data string assembler 36 passes the segmented string as a Uniform Resource Identifier (URI) encoding to the ValidateURI Method 42 of the RFID validator object 40. If the RFID validator object 40, or more specifically, the method 42, validates the URI, it passes the validated URI to the print handler 38 of the computer program 32 which passes the string to the processor 18. The processor 18 passes the validated RFID tag data to an RFID encoder 52 for writing the data into an RFID tag. If the RFID validator object 40, or more specifically, the method 42, does not validate the data, the RFID validator object passes the invalidated string back to the processor 18. In one embodiment, the RFID validator object 40 passes the invalidated string to the error message generator 37 which generates an error message that indicates why the RFID tag data is not valid. The error message can be sufficiently detailed so as to be instructive to the user as to what needs to be done to correct the data to be encoded in the tag. The computing device 10 displays this error message on the output device 16. In one embodiment, the system is configured to allow a user to correct the error using an input device 14 which would provide the corrected data to the processor for validation.

RFID Tag Data Validation Methods

Figure 2:
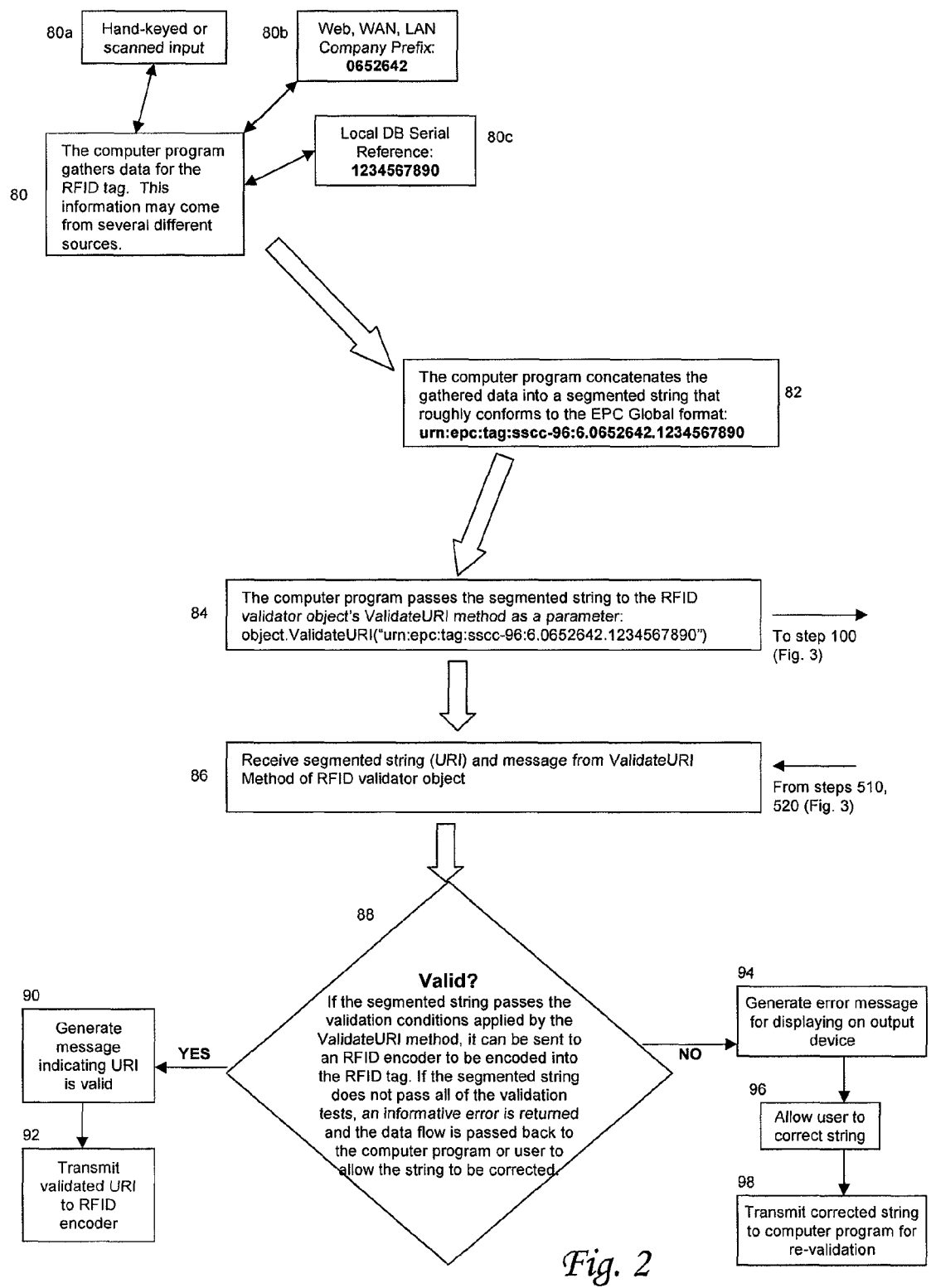
FIG. 2 is a flow diagram that illustrates a method for gathering RFID tag data and validating the data.

FIG. 2 illustrates an embodiment of a method of using the RFID Validation System to validate RFID tag data. FIG. 3 illustrates an embodiment of the steps of using the ValidateURI Method 42 of the RFID validator object 40 for validating RFID tag data.

In one embodiment of the invention, the processor 18 of the computing device 10 executes the data collector 34 of the computer program 32 to begin the RFID validation process. At step 80, the data collector 34 collects or gathers RFID tag data from one or several sources.

In one embodiment, RFID tag data includes a company identification number, a product serial number, an object class identifier number, among other data. These data can be components of an RFID segmented string, as discussed further below. As shown in step 80a, the data collector 34 can gather data that is input by a user or machine, such as via an input device 14. At step 80b, the data collector 34 can gather a company identification number (shown in FIG. 2 as "0652642") from, for example, the Internet, a wide-area network (WAN), or local area network (LAN). The data collector 34 can access these sources via the network 64 and server 62, for example. At step 80c, the data collector 34 can gather a product serial number (shown in FIG. 2 as "1234567890"), which in one embodiment is stored in a data storage unit 60. In one embodiment, the data storage unit 60 is configured to receive and store RFID tag related data such as through user input or from another source.

Figure 3:
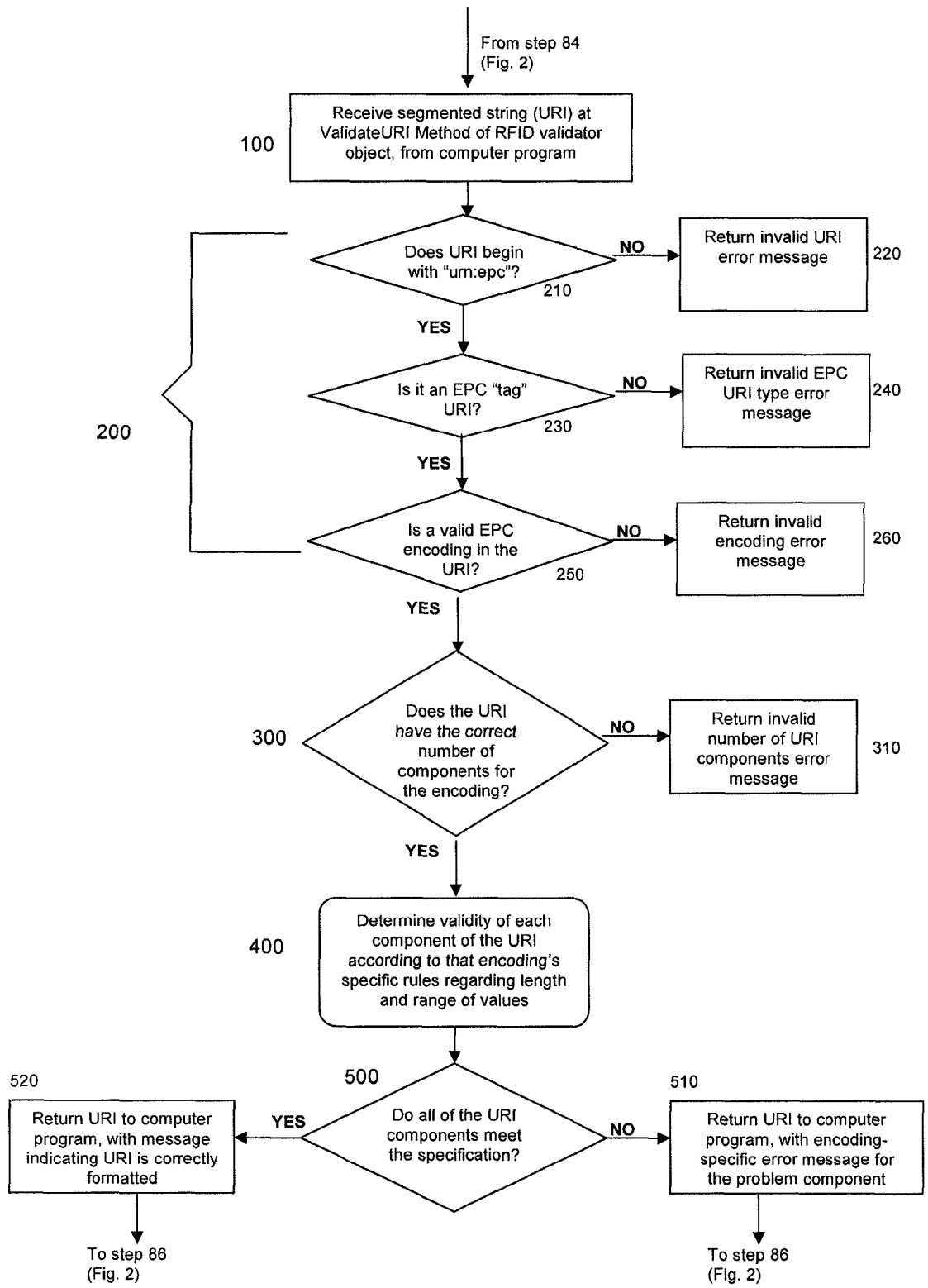
FIG. 3 is a flow diagram that illustrates the steps of validating RFID tag data.

The data collector 34 then passes the RFID tag data to a data string assembler 36 which, at step 82, concatenates the gathered data into a segmented string, or URI as shown in FIG. 3, which is in an RFID format. Several RFID formats are known, such as the Electronic Product Code (EPC) Global format, the ISO (International Organization for Standardization) format, Department of Defense (DOD) format, or other RFID format known in the art. An RFID format generally dictates the number of components that comprise a valid URI, the specific rules for the length and range of values of each component, and the correct order or placement of these components in the URI.

In one embodiment, the RFID format is the Electronic Product Code (EPC) Global format, which can be further a first or second generation ("Gen 1", "Gen 2") EPC URI, which include the 64-bit and 96-bit formats well known in the art. Further, the EPC URI can be of an identity type such as a General Identifier (GID), Serialized Global Trade Identification Number (SGTIN), Serial Shipping Container Code (SSCC), Serialized Global Location Number (SGLN), Global Returnable Asset Identifier (GRAI), Global Individual Asset Identifier (GIAI). The exemplary embodiment of a URI, as shown in FIGS. 2 and 3, is an SSCC URI and includes components such as a header, which defines the overall length, identity type, and structure of the URI encoding, as represented in FIG. 2 by "urn:epc:tag:sscc-96:". An SSCC URI further includes a Filter Type component ("6" in FIG. 2), a Company Prefix component ("0652642" in the example of FIG. 2), and a Serial Reference component ("1234567890" in the example of FIG. 2).

At step 84, the data string assembler 36 passes the segmented string (or URI) to the ValidateURI Method 42 of the RFID validator object 40 as a parameter for validation. At step 100, as shown in FIG. 3, the ValidateURI Method 42 of the RFID validator object 40 receives the URI from the computer program. The ValidateURI Method 42 determines if the data string assembler 36 assembled the string with the components in the correct placement for encoding and for validation (not shown). At step 200, the ValidateURI Method validates the first component, or header, of the URI. This step can involve one or more sub-steps, as illustrated in FIG. 3. In one embodiment, at step 210, the ValidateURI Method 42 determines if the header begins with "urn:epc." If it does not, at step 220 the RFID validator object 40 passes the URI back to the error message generator 37 which generates an invalid URI error message. Otherwise, at step 230, the ValidateURI Method 42 determines if the URI is of the "tag" type for encoding onto an RFID tag. If it is not, at step 240, the RFID validator object 40 passes the URI back to the error message generator 37 which generates an invalid EPC URI type error message. Otherwise, at step 250, the ValidateURI Method 42 determines if the URI has valid EPC encoding to define the identity type and overall length of the URI, as described above. If it does not, at step 260 the RFID validator object 40 passes the URI to the error message generator 37 which generates an invalid encoding error message. In further embodiments of the present invention, the steps of the error message generator 37 generating an invalidity error message (such as steps 220, 240, and 260) further include the step of the error message generator 37 generating an informative error message configured to indicate to a user the nature of the error and how the user can correct the data.

If the RFID validator object 40 validated the header at step 200 (including the sub-steps), at step 300, the ValidateURI Method determines if the URI has the correct number of components for encoding. If the URI does not have the correct number of components, at step 310 the RFID validator object 40 passes the URI to the error message generator 37, which generates a specific error message indicating that the URI does not have the correct number of components for the encoding. In one embodiment of the present invention, the error message generator 37 generates an informative error message indicating what the correct number of components would be. In a further embodiment, the error message generator 37 indicates which component or components are missing.

At step 400, the method determines the validity of each component of the URI according to the specific rules regarding the length and range of values of each component. At step 500, the ValidateURI Method 42 determines if all of the URI components meet the validity standards specified by the RFID format, which is the EPC Global format in FIG. 3. At step 520, if each URI component meets the RFID standard, the RFID validator object 40 passes the validated URI to the computer program 32 and a message indicating that the URI is valid. In one embodiment, the RFID validator object 40 passes the validated URI to the encoder handler 38 of the computer program 32. At step 86 (FIG. 2), the computer program 32 receives the URI and the message indicating URI validity from the ValidateURI method 42 of the RFID validator object 40.

At step 510, in another embodiment, if one or more URI component is not validated in compliance with the RFID format, the RFID validator object 40 passes the invalidated URI to the computer program 32 with a message indicating that the URI is not valid. In one embodiment, the RFID validator object 40 passes the URI to the error message generator 37, which is configured to generate an error message indicating that the URI is not valid. At step 86 (FIG. 2), the computer program 32 receives the URI and the message indicating that the URI is not valid from the ValidateURI method 42 of the RFID validator object 40.

As described above, at step 86 (FIG. 2), the computer program 32 receives the segmented string (URI) from the RFID validator object 40 and a message from the RFID validator object 40 indicating whether the URI is valid or not valid in compliance with an RFID format. At step 88, the computer program 32 determines if the URI is valid or not. If valid, at step 90, the computer program 32 generates a message indicating that the URI is valid. The computer program then passes this message to the processor 18 which displays the message at an output device 16 of the computing device 10. At step 92, the encoder handler 38 of the computer program 32 transmits the validated URI to the RFID encoder 52 of an RFID printer 50 for encoding into an RFID tag.

If, at step 88, the computer program 32 determines that the URI is not valid, at step 94 the error message generator 37 of the computer program 32 generates an error message indicating that one or more component of the URI is not valid. In one embodiment, the error message indicates the specific error for each component that did not meet validation conditions. In a further embodiment, this error message is informative to a user and provides the user with instructions to correct the error, or provides an example of a correctly formatted component, or provides other pertinent information to allow the user to correct the error. In another embodiment, at step 96, the processor 18 is configured to execute the computer program 32 to retrieve additional or corrected RFID tag data from a user. Alternatively, in one embodiment, the computer program passes the invalidated URI to a user and prompts the user at an output device 16 to correct the URI. The user can then input the corrected RFID tag data via the input device 14, which provides the corrected data to processor 18 which, at step 96, further transmits the URI to the computer program 32 which begins the validation method anew.

The informative error messages described above which are generated by the error message generator 37 to be displayed to a user may come in several different forms, and generally indicate to a user the nature of the error and how a user can correct the error. For example, in one embodiment at step 310, the informative error message indicates that the URI does not have the correct number of components for encoding and indicates the one or more component that is missing. In another embodiment, at step 510, if a component did not meet the validity requirements of that component's specific rules regarding length and range of values, the informative error message indicates the component that was not validated, the reason that the component was not validated, and indicates how a user can correct the component, such as by providing to the user the correct length required for the component and the range of values acceptable for that component. In a further embodiment, the informative error message provides an example of a properly formatted component in order for a user to further understand the nature of the error and how to correct the error.

Alternative Embodiments

Although in the foregoing descriptions of RFID validation systems and methods, the memory 30 is internal to the computing device 10 and is configured to store both the computer program 32 and the RFID validator object 40, other embodiments are possible. For example, in one embodiment, a first computing device 10 has a memory 30 configured to store a computer program 32, and a second computing device 70, external to the first computing device 10 stores an RFID validator object 72 which is executable by the processor to validate RFID tag data in compliance with an RFID format. In one embodiment, the transmission of data between the first computing device 10 and the second computing device 70 occurs via the network 64. In this embodiment, upon assembling the URI, the data string assembler 36 passes the URI to the ValidateURI Method 74 of the RFID validator object 72 stored in the memory (not shown) of the external second computing device 74. If the ValidateURI Method 74 of the RFID validator object 72 validates the URI, the RFID validator object 72 passes the URI back to the processor 18, which further transmits the URI to an RFID encoder 52 to write the URI into the RFID tag.

In an alternative embodiment, the second computing device 70 is configured to store a second memory (not shown), which is further configured to store the computer program (not shown) and the RFID validator object 72. The method would follow that as described above, with the additional steps of the processor 18 transmitting and receiving data from the external computer program via the network 64.

All trademarks identified herein are the property of their respective owners. Reference to the trademark owners is made solely for purposes of identifying the source of various products or services offered by such owners, and is in no way intended to trade upon or dilute good will associated with the owners or their marks.

The invention claimed is:

1. A system for validating radio-frequency identification (RFID) tag data comprising:
   a computing device comprising one or more memory storage areas and one or more processors, the one or more processors configured to:
   receive RFID tag data and concatenate the RFID tag data into a segmented string that comprises a plurality of data components;
   execute an RFID validator object, wherein to execute the RFID validator object, the one or more processors of the computing device are further configured to:
   pass the segmented string to the RFID validator object to determine if the segmented string is in an RFID format, wherein the RFID format provides standards that define (a) the correct placement for each of the plurality of data components in the segmented string, (b) the correct number of data components in the segmented string, and (c) rules for the length and range of values for each of the plurality of data components;

determine, in accordance with the RFID format, if the plurality of data components are in the correct placement;

determine, in accordance with the RFID format, if the segmented string has the correct number of data components; and determine, in accordance with the RFID format, if each data component is in compliance with the rules for the length and range of values for the respective data components; and an RFID encoder connected to the computing device configured to:

receive the RFID tag data after being validated via the RFID validator object; and encode an RFID tag with the RFID tag data.

2. The system of claim 1, wherein the RFID format is the Electronic Product Code (EPC) Global format.

3. The system of claim 1, wherein the one or more processors of the computing device are further configured to transmit the RFID tag data to the RFID encoder for writing the RFID tag data into an RFID tag in response to the RFID validator object determining that the RFID tag data is valid in accordance with the RFID format.

4. The system of claim 3, wherein the one or more processors of the computing device are further configured to:

in response to the RFID validator object determining that the RFID tag data is not valid in accordance with the RFID format, generate a message indicating one or more reasons that the RFID tag data is not valid; and cause display of the message via the computing device to prompt a user to correct the RFID tag data.

5. The system of claim 4, wherein the computing device further comprises an input device configured to receive a corrected segmented string from a user in response to the error message.

6. A system for validating radio-frequency identification (RFID) tag data comprising:

a computing device comprising one or more memory storage areas and one or more processors, the one or more processors configured to:

receive RFID tag data and concatenate the RFID tag data into a segmented string that comprises a plurality of data components;

determine if the segmented string is in an RFID format, wherein the RFID format provides standards that define (a) the correct placement for each of the plurality of data components in the segmented string, (b) the correct number of data components in the segmented string, and (c) rules for the length and range of values for each of the plurality of data components;

determine, in accordance with the RFID format, if the plurality of data components are in the correct placement;

determine, in accordance with the RFID format, if the segmented string has the correct number of data components; and determine, in accordance with the RFID format, if each data component is in compliance with the rules for the length and range of values for the respective data components; and an RFID encoder connected to the computing device configured to:

receive the RFID tag data after being validated; and encode an RFID tag with the RFID tag data.

7. The system of claim 6, wherein the RFID format is the Electronic Product Code (EPC) Global format.

8. The system of claim 6, wherein the one or more processors of the computing device are further configured to transmit the RFID tag data to the RFID encoder for writing the RFID tag data into an RFID tag in response to determining that the RFID tag data is valid in accordance with the RFID format.

9. The system of claim 8, wherein the one or more processors of the computing device are further configured to:

in response to determining that the RFID tag data is not valid in accordance with the RFID format, generate a message indicating one or more reasons that the RFID tag data is not valid; and cause display of the message via the computing device to prompt a user to correct the RFID tag data.

10. The system of claim 9, wherein the computing device further comprises an input device configured to receive a corrected segmented string from a user in response to the error message.

11. A method of validating data to be written into a radio-frequency identification (RFID) tag using a computing device and an RFID encoder, comprising the steps of:

receiving, via a computing device, RFID tag data and concatenating the RFID tag data into a segmented string that comprises a plurality of data components;

executing, via the computing device, an RFID validator object, wherein executing the RFID validator object further comprises:

passing the segmented string to the RFID validator object to determine if the segmented string is in an RFID format, wherein the RFID format provides standards that define (a) the correct placement for each of the plurality of data components in the segmented string, (b) the correct number of data components in the segmented string, and (c) rules for the length and range of values for each of the plurality of data components;

determining, in accordance with the RFID format, if the plurality of data components are in the correct placement;

determining, in accordance with the RFID format, if the segmented string has the correct number of data components; and determining, in accordance with the RFID format, if each data component is in compliance with the rules for the length and range of values for the respective data components;

receiving, via an RFID encoder, the RFID tag data after being validated via the RFID validator object; and encoding, via the RFID encoder, an RFID tag with the RFID tag data.

12. The method of claim 11, wherein the RFID format is the Electronic Product Code (EPC) Global format.

13. The method of claim 11 further comprising transmitting the RFID tag data from the computing device to the RFID encoder in response to determining that the RFID tag data is valid in accordance with the RFID format.

14. The method of claim 11 further comprising:

generating, via the computing device, a message indicating one or more reasons that the RFID tag data is not valid in response to the RFID validator object determining that the RFID tag data is not valid in accordance with the RFID format; and causing display of the message via the computing device to prompt a user to correct the RFID tag data.

15. The method of claim 14 further comprising receiving a corrected segmented string from a user in response to the error message.

16. The method of claim 14 further comprising re-executing the RFID validator object to determine if the corrected segmented string is valid in accordance with the RFID format.

17. The method of claim 11, wherein the step of generating a message indicating one or more reasons that the RFID tag data is not valid further comprises the sub-step of generating a specific error message for each component of the segmented string that is not valid.

18. The method of claim 17, wherein the step of generating a specific error message for each component of the segmented string that is not valid further comprises the sub-step of generating an informative message indicating how a user can correct the specific error of each component.

19. The method of claim 11, wherein the step of transmitting the RFID tag data to an RFID encoder for writing the RFID tag data into an RFID tag further comprises the sub-step of generating a message indicating that the segmented string is correctly formatted.

20. A method of validating data to be written into a radio-frequency identification (RFID) tag using a computing device and an RFID encoder, comprising the steps of:
   receiving, via a computing device, RFID tag data and concatenating the RFID tag data into a segmented string that comprises a plurality of data components;
   determining, via the computing device, if the segmented string is in an RFID format, wherein the RFID format provides standards that define (a) the correct placement for each of the plurality of data components in the segmented string, (b) the correct number of data components in the segmented string, and (c) rules for the length and range of values for each of the plurality of data components;
      determining, in accordance with the RFID format, if the plurality of data components are in the correct placement;
      determining, in accordance with the RFID format, if the segmented string has the correct number of data components; and
      determining, in accordance with the RFID format, if each data component is in compliance with the rules for the length and range of values for the respective data components; and
   receiving, via an RFID encoder, the RFID tag data after being validated; and
   encoding, via the RFID encoder, an RFID tag with the RFID tag data.

21. The method of claim 20, wherein the RFID format is the Electronic Product Code (EPC) Global format.

22. The method of claim 20 further comprising transmitting the RFID tag data from the computing device to the RFID encoder in response to determining that the RFID tag data is valid in accordance with the RFID format.

23. The method of claim 20 further comprising:
   generating, via the computing device, a message indicating one or more reasons that the RFID tag data is not valid in response to determining that the RFID tag data is not valid in accordance with the RFID format; and
   causing display of the message via the computing device to prompt a user to correct the RFID tag data.

24. The method of claim 23 further comprising receiving a corrected segmented string from a user in response to the error message.

25. The method of claim 24 further comprising determining, via the computing device, if the corrected segmented string is the RFID format.

26. The method of claim 23, wherein the step of generating a message indicating one or more reasons that the RFID tag data is not valid further comprises the sub-step of generating a specific error message for each component of the segmented string that is not valid.

27. The method of claim 26, wherein the step of generating a specific error message for each component of the segmented string that is not valid further comprises the sub-step of generating an informative message indicating how a user can correct the specific error of each component.

28. The method of claim 20, wherein the step of transmitting the RFID tag data to an RFID encoder for writing the RFID tag data into an RFID tag further comprises the sub-step of generating a message indicating that the segmented string is correctly formatted.

29. A method of validating data to be written into a radio-frequency identification (RFID) tag using a computing device and an RFID encoder, comprising the steps of:
   receiving, via a computing device, a segmented string that comprises a plurality of data components;
   executing, via the computing device, an RFID validator object, wherein executing the RFID validator object further comprises:
      passing the segmented string to the RFID validator object to determine if the segmented string is in an RFID format, wherein the RFID format provides standards that define (a) the correct placement for each of the plurality of data components in the segmented string, (b) the correct number of data components in the segmented string, and (c) rules for the length and range of values for each of the plurality of data components;
      determining, in accordance with the RFID format, if the plurality of data components are in the correct placement;
      determining, in accordance with the RFID format, if the segmented string has the correct number of data components; and
      determining, in accordance with the RFID format, if each data component is in compliance with the rules for the length and range of values for the respective data components;
   receiving, via an RFID encoder, the RFID tag data after being validated via the RFID validator object; and
   encoding, via the RFID encoder, an RFID tag with the RFID tag data.

30. The method of claim 29, wherein the RFID format is the Electronic Product Code (EPC) Global format.

31. The method of claim 29 further comprising transmitting the RFID tag data from the computing device to the RFID encoder in response to determining that the RFID tag data is valid in accordance with the RFID format.

32. The method of claim 29 further comprising:
   generating, via the computing device, a message indicating one or more reasons that the RFID tag data is not valid in response to the RFID validator object determining that the RFID tag data is not valid in accordance with the RFID format; and
   causing display of the message via the computing device to prompt a user to correct the RFID tag data.

33. The method of claim 32 further comprising receiving a corrected segmented string from a user in response to the error message.

34. The method of claim 32 further comprising re-executing the RFID validator object to determine if the corrected segmented string is valid in accordance with the RFID format.

35. The method of claim 29, wherein the step of generating a message indicating one or more reasons that the RFID tag data is not valid further comprises the sub-step of generating a specific error message for each component of the segmented string that is not valid.

36. The method of claim 35, wherein the step of generating a specific error message for each component of the segmented string that is not valid further comprises the sub-step of generating an informative message indicating how a user can correct the specific error of each component.

37. The method of claim 29, wherein the step of transmitting the RFID tag data to an RFID encoder for writing the RFID tag data into an RFID tag further comprises the sub-step of generating a message indicating that the segmented string is correctly formatted.

* * * * *